Nov. 17, 1964     J. O. TJEBBEN     3,157,827
TILT OUT TRUNNION ARRANGEMENT FOR ENCLOSED
SWITCHBOARD STRUCTURES
Filed Oct. 31, 1960

Inventor
John O. Tjebben
By Robert C. Benson
Attorney

United States Patent Office 3,157,827
Patented Nov. 17, 1964

3,157,827
TILT OUT TRUNNION ARRANGEMENT FOR ENCLOSED SWITCHBOARD STRUCTURES
John O. Tjebben, Milwaukee, Wis., assignor to Allis-Chalmers Manufacturing Company, Milwaukee, Wis.
Filed Oct. 31, 1960, Ser. No. 66,280
8 Claims. (Cl. 317—99)

This invention relates generally to enclosed switchboard structures. More specifically, this invention relates to enclosed switchboard structures in which a transformer is mounted on a rotatable barrier mounted in the opening to the enclosed structure and has to be rotated out of the structure before access can be had to either the transformer or the primary conductor within the structure.

Tilt out trunnion arrangements in enclosed switchboard structures are well known in the art. In most of these structures, the tilt out trunnion or barrier on which the transformer or fuses or other electrical apparatus is mounted is pivoted at the outer surface of the enclosing structure. In such a structure the center of gravity of the tilt out assembly is spaced inward from the pivot point of the carrier. Therefore, if the assembly on the tilt out carrier is heavy it is quite difficult to tilt the apparatus out of the enclosing structure.

In the past some tilt out carriers have been rotatably mounted near their center of gravity which is a point spaced inward from the outer wall of the enclosing structure. However, in such an arrangement the electrical apparatus could not be tilted out of the enclosing structure beyond a vertical plane without removing at least a portion of the access barrier between the pivot point of the carrier and the bottom of the enclosure. If the bottom barrier is not removed it is extremely difficult to rotate the electrical apparatus mounted on the tilt out trunnion far enough out of the enclosure so that it is easily accessible. If a portion of the lower barrier is removed, it makes the high voltage terminal within the cabinet accessible during the time when the electrical apparatus on the trunnion is being serviced. This, of course, is an undesirable situation from a safety point of view.

The switchboard structure of this invention overcomes the problems mentioned above by mounting the tilt out trunnion near its center of gravity and making the barrier plate between the tilt out trunnion and the bottom of the enclosure pivoted. The tilt out trunnion and the lower barrier are connected together with suitable linkage so that as the tilt out carrier rotates the lower barrier pivots inward to allow the tilt out carrier to rotate beyond the vertical plane so as to more fully expose the electrical apparatus carried thereon. Also as the lower barrier pivots inward it maintains a very close spaced relationship with the outer surface of the tilt out trunnion so as to prevent access to the high voltage contacts within the cubicle.

Therefore, it is the object of this invention to provide a new and improved tilt out switchboard structure.

Another object of this invention is to provide a new and improved tilt out trunnion for an enclosed switchboard structure in which the tilt out carrier is easier to rotate.

Another object of this invention is to provide a new and improved tilt out carrier for an enclosed switchboard structure in which a plate is pivotably mounted to the enclosure, to act as a barrier and make the apparatus mounted on the tilt out carrier more accessible for servicing.

Objects and advantages other than those set forth above will be apparent from the following description when read in connection with the accompanying drawings, in which.

Figure 1:
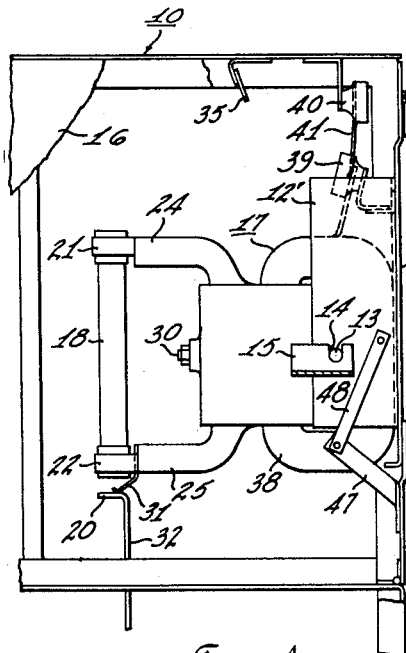
FIG. 1 is a side view partially in section with the tilt out carrier in the closed position and the contacts engaged.
Figure 3:
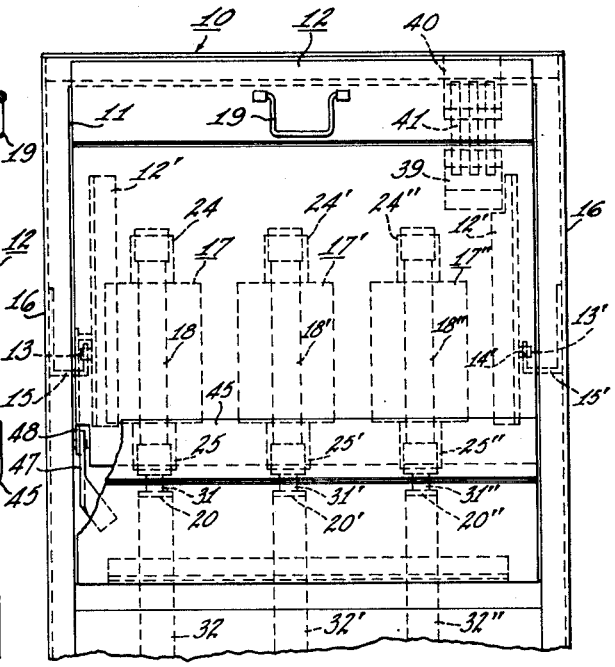
FIG. 3 is an end view of the structure illustrated in FIG. 1.
Figure 2:
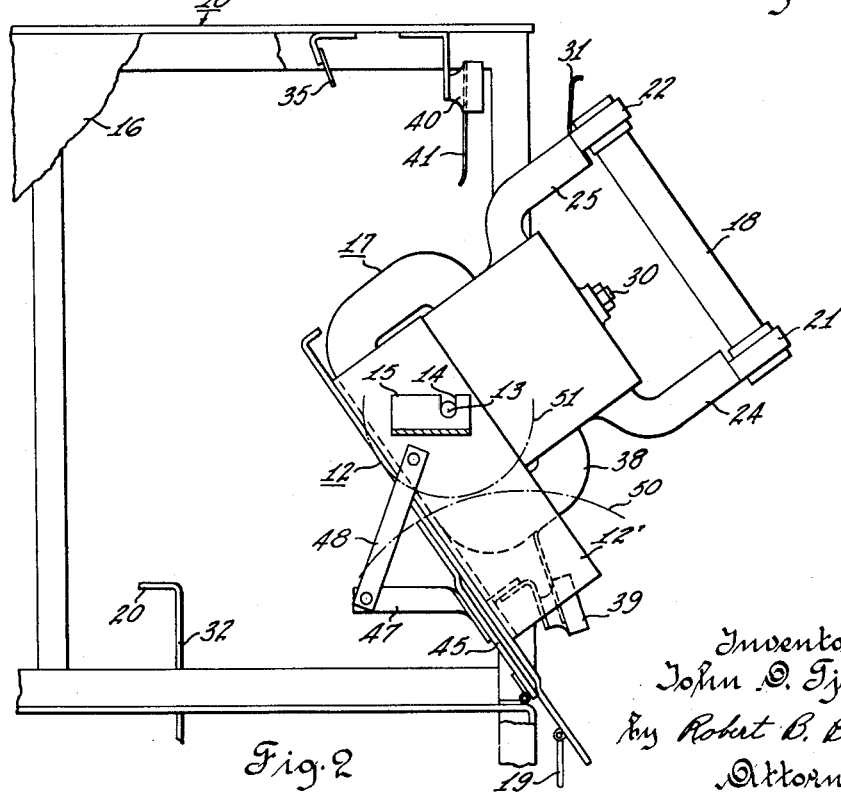
FIG. 2 is a side view partially in section with the tilt out trunnion rotated to expose the electrical apparatus mounted thereon.

Referring more particularly to the drawing by characters of reference FIGS. 1–3 illustrate a compartment or enclosure 10 of a control apparatus such as, for example, a switchboard structure. Enclosure 10 is provided with an opening 11 through which access to the inside of the enclosure is obtained. A control panel or base 12 having inwardly extending portions 12′ is rotatably mounted on trunnions 13, 13′. The trunnions 13, 13′ are supported within notches 14, 14′ of mounting brackets 15, 15′ which are welded to frame 16 of the switchboard structure forming enclosure 10.

One or more potential transformers and their associated fuses may be mounted on base 12. As shown in FIG. 3, base 12 has three potential transformers 17, 17′ and 17″ and electrically associated fuses 18, 18′ and 18″ mounted thereon in such a manner that when base 12 is in a first predetermined position shown in FIG. 1 the transformers and fuses are energized in enclosure 10 by engaging live terminal 20 and when rotated to a second predetermined position the transformers and fuses are in a deenergized position and disposed outside of the enclosure. Transformers 17, 17′ and 17″ are so mounted on the base 12 that the center of gravity of the assembly, when positioned as in FIG. 1, lies close to the same vertical plane as the trunnions 13, 13′ of base 12. This type of balanced mounting makes it much easier to rotate the transformers from the first engaging position as shown in FIG. 1 to the nonengaging position shown in FIG. 2. A folding handle 19 is loosely attached to an extension of base 12 so that an operator can move the base and transformer assembly.

As illustrated in the drawing, transformers 17, 17′ and 17″ are each provided with clips 21 and 22 which serve as holders for fuses 18, 18′ and 18″. Clips 21 are arranged at one of the terminal ends 24, 24′ and 24″ of the primary windings of the transformers and in electrical contact therewith while clips 22 are mounted on insulating supports 25, 25′ and 25″ of these transformers. The other end of the primary winding of these transformers terminate at 30. Terminal elements 31, 31′ and 31″ connected to terminal clips 22 and insulating supports 25, 25′ and 25″ of transformers 17, 17′ and 17″ form electrical contact with the bus bars 32, 32′ and 32″, respectively, through terminals 20, 20′ and 20″.

While pivoted from the energized position shown in FIG. 1 to the deenergized position shown in FIG. 2 the primary windings of the transformers and their transformer mounted current limiting fuses 18, 18′ and 18″ are automatically grounded to remove any charge from the windings. This is accomplished by having metallic clips 21 and 22 at both ends of the fuses and terminal elements 31, 31′ and 31″ engage grounding terminals 35, which are conductively connected to the frame of the switchboard enclosure.

The terminals of the secondary windings 38 of the transformers are arranged for connection to a terminal block 39 fixedly mounted on base 12 of the switchboard structure. The stationary wiring is arranged for connection to a plurality of terminal elements 40 which form sliding finger contacts 41 for engaging while in transformer energized position in enclosure 10 with terminal block 39 mounted on base 12.

A barrier plate 45 is pivotally mounted at one end of the opening and extends toward and partially overlaps the base 12. This barrier plate 45 cooperates with the base in the energized position shown in FIG. 1 to act as a cover or door for the enclosure 10 to prevent access to the interior of the enclosure through the opening 11. The barrier plate 45 is connected to the base 12 of the tilt out assembly by a suitable linkage such as the arms 47, 48. Arm 47 is fixedly attached to the pivoted barrier 45 at one end and loosely attached to the second arm 48 at the other end. The second arm 48 is loosely attached at its other end to the inwardly extending portion 12' of base 12.

As the tilt out assembly is rotated through the opening from the engaging position shown in FIG. 1 to the nonengaging position shown in FIG. 2, the pivoted barrier plate 45 moves from the position shown in FIG. 1 to the position shown in FIG. 2. As shown in FIG. 2, the top of the barrier plate 45 moves along the arc 50 and the face of the base 12 moves along the arc 51. It is obvious from comparing the arcs that during the entire rotation of the tilt out assembly there is substantially no access to the interior of the enclosure between the base 12 and the barrier. It is also obvious from reference to FIG. 2 that the fuse is positioned farther out of the cubicle than would have been possible if the lower barrier were not pivoted. If the lower barrier were not pivoted, the maximum that the base could rotate would be close to 90 degrees whereas in the illustrated structure the base is rotated almost a full 170 degrees. This added rotation of the base makes the fuse and electrical contacts mounted on the base much more accessible for servicing.

With the switch structure in racked in position as shown in FIG. 1, operation thereof is as follows:

The operator takes hold of handle 19 and pulls the tilt out carrier assembly out and down. The transformer assembly rotates on its trunnions 13, 13' in notches 14, 14' of brackets 15, 15' through angle of approximately 170 degrees. As the transformer assembly rotates, the barrier plate 45 pivots into the enclosure from the position of FIG. 1 to the position of FIG. 2. At this point the transformer assembly is disconnected, deenergized by grounding and rests against barrier plate 45. Fuses can now be removed easily by taking hold of the fuse in one hand and pulling it out of the fuse clips. Because the transformer is disconnected this operation is completely safe. To remove the transformer assembly including base 12 from the enclosure the operator merely lifts the unit upward a short distance, about an inch, to lift the trunnions 13, 13' out of grooves 14, 14' in brackets 15, 15'.

To connect and reenergize the transformer assembly, the operator merely takes hold of the collapsible handle and pulls up. The base 12 and the transformer assembly rotate through substantially 170 degrees into energized position. During this operation the barrier plate 45 pivots outward to a position flush with the end of the enclosure as shown in FIG. 1. In this position the barrier plate 45 and the base 12 combine to completely fill the opening 11 and block access to the interior of the enclosure. Hence, no outer door is required on this structure.

Although but one embodiment of the present invention has been illustrated and described, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. An enclosed switch structure comprising: an enclosure having an access opening therein, an electrical contact terminal disposed within said enclosure inwardly of said opening, a tilt out carrier comprising a base mounted for rotation within said opening between engaging position and a nonengaging position, a barrier plate pivotably mounted at one end of said opening, said base connected to and combining with said plate to form a barrier between said electrical contact terminal and said opening in both said positions.

2. An enclosure switch structure comprising: an enclosure having an access opening therein, an electrical terminal disposed within said enclosure inwardly of said opening, a tilt out carrier comprising a base having a contact mounted thereon, said carrier being mounted near its center of gravity and within said enclosure for rotation within said opening between a contact engaging position and a nonengaging position, a barrier plate pivotably mounted at one end of said opening, said base combining with said plate to form a barrier between said electrical terminal and said opening in both said engaging and said nonengaging positions.

3. An enclosed switch structure comprising: an enclosure having an access opening therein, an electrical terminal disposed within said enclosure inwardly of said opening, a tilt out carrier comprising a base having a contact mounted thereon, said carrier being mounted near its center of gravity and within said enclosure for rotation within said opening between a contact engaging position and a nonengaging position, a barrier plate pivotably mounted at one end of said opening, means connecting said base to said plate whereby said base and said plate cooperate to form a barrier between said terminal and said opening as said base rotates between said engaging and nonengaging positions.

4. An enclosed switch structure comprising: an enclosure having an opening at one end, an electrical contact terminal disposed within said enclosure inwardly of said opening, a tilt out carrier comprising a base, said base being mounted at a point within said enclosure for rotation within said opening, an electrical contact terminal mounted on said carrier and positioned to engage said contact terminal within said enclosure when said base is in a first position and to be disposed outside of said enclosure when said base is rotated to a second position, a plate pivotably connected to said enclosure at one end of said opening and combining with said base to form a barrier to said first electrical contact through said opening, and means connecting said base to said plate whereby upon rotation of said base said plate is pivoted within said enclosure.

5. An enclosed switch structure comprising: an enclosure having an opening at one end, an electrical contact terminal disposed within said enclosure inwardly of said opening, a tilt out carrier comprising a base, said base being mounted at a point within said enclosure for rotation within said opening, an electrical contact terminal mounted on said carrier and positioned to engage said contact terminal within said enclosure when said base is in a first position and to be disposed outside of said enclosure when said base is rotated to a second position, a plate pivotably connected to said enclosure at one end of said opening and combining with said base to form a barrier to said first electrical contact through said opening, and a pair of arms connecting said base to said plate whereby upon rotation of said base said plate is pivoted within said enclosure.

6. An enclosed switch structure comprising: an enclosure having an opening at one end, a first electrical contact terminal disposed within said enclosure inwardly of said opening, a tilt out carrier comprising a base, said base being mounted at a point within said enclosure for rotation within said opening, a second electrical contact terminal mounted on said carrier and positioned to engage said contact terminal within said enclosure when said base is in a first position and to be disposed outside of said enclosure when said base is rotated to a second position, a plate pivotably connected to said enclosure at one end of said opening and combining with said base to form a barrier to said first electrical contact through said opening, a first arm attached at one end to said base and having the other end extending into said enclosure, a second arm loosely connected to said other end of said first arm and to said carrier, whereby upon rotation of said base said plate is pivoted within said enclosure.

7. An enclosed switch structure comprising: an enclosure having an opening at one end, a first electrical contact terminal disposed within said enclosure inwardly of said opening, a tilt out carrier comprising a base, said base being mounted at a point within said enclosure for rotation with said opening, a second electrical contact terminal mounted on said carrier and positioned to engage said contact terminal within said enclosure when said base is in a first position and to be disposed outside of said enclosure when said base is rotated to a second position, a plate pivotably connected to said enclosure at one end of said opening and combining with said base in said first position to completely fill said opening to form a barrier to said first electrical contact through said opening, a first arm attached at one end to said base and having the other end extending into said enclosure, a second arm loosely connected to said other end of said first arm and to said carrier, whereby upon rotation of said base said plate is pivoted within said enclosure and combines with said base during rotation and in said second position to prevent access to said first electrical contact between said base and said plate.

8. An enclosed switch structure comprising: an enclosure having an opening at one end, a first electrical contact terminal disposed within said enclosure inwardly of said opening, a tilt out carrier comprising a base, said base being mounted at a point within said enclosure for rotation within said opening, a transformer comprising a coil having a contact terminal, a fuse electrically connected with said transformer and having a contact terminal, said transformer and said fuse being mounted on said base for rotation therewith, said contact terminal of said transformer and said fuse engaging said first electrical contact terminal when in one position and becoming disconnected from said electrical contact terminals and disposed outside of said enclosure when said carrier is rotated to a second position, a plate pivotably connected to said enclosure at one end of said opening and combining with said base to form a barrier to said first electrical contact through said opening, a first arm attached at one end to said base and having the other end extending into said enclosure, a second arm loosely connected to said other end of said first arm and to said carrier, whereby upon rotation of said base said plate is pivoted within said enclosure.

References Cited in the file of this patent

UNITED STATES PATENTS

| | | |
|---|---|---|
| 726,548 | Lemp | Apr. 28, 1903 |
| 1,126,788 | Kries | Feb. 2, 1915 |
| 2,769,940 | Pettit | Nov. 6, 1956 |
| 2,795,739 | Wood | June 11, 1957 |
| 2,815,410 | Pearson | Dec. 3, 1957 |
| 3,052,820 | Kreekon et al. | Sept. 4, 1962 |

FOREIGN PATENTS

| | | |
|---|---|---|
| 85,815 | Sweden | Mar. 17, 1936 |
| 740,906 | France | Feb. 3, 1933 |